(12) United States Patent
Li et al.

(10) Patent No.: US 8,894,860 B2
(45) Date of Patent: Nov. 25, 2014

(54) GALLIUM-68 RADIOISOTOPE GENERATOR AND GENERATING METHOD THEREOF

(75) Inventors: Ming-Hsin Li, Taoyuan County (TW);
Jin-Jenn Lin, Taoyuan County (TW);
Ther-Jen Ting, Taoyuan County (TW);
I-Lea Dai, Taipei (TW)

(73) Assignee: Institute of Nuclear Energy Research, Atomic Energy Council, Executive Yuan, Taoyuan County (TW)

( * ) Notice: Subject to any disclaimer, the term of this patent is extended or adjusted under 35 U.S.C. 154(b) by 952 days.

(21) Appl. No.: 12/963,263

(22) Filed: Dec. 8, 2010

(65) Prior Publication Data
US 2012/0011965 A1      Jan. 19, 2012

(30) Foreign Application Priority Data
Jul. 14, 2010   (TW) ................................ 99123148 A

(51) Int. Cl.
*B01D 15/36*   (2006.01)
*B01D 15/04*   (2006.01)
*B01D 15/08*   (2006.01)
*G21F 5/00*    (2006.01)
*G21G 1/00*    (2006.01)

(52) U.S. Cl.
CPC ...... *B01D 15/361* (2013.01); *G21G 2001/0021* (2013.01); *G21G 1/0005* (2013.01)
USPC .......................... 210/661; 210/668; 250/496.1

(58) Field of Classification Search
None
See application file for complete search history.

(56) References Cited

U.S. PATENT DOCUMENTS

| | | | | |
|---|---|---|---|---|
| 4,330,507 | A | * | 5/1982 | Lewis .......................... 424/1.61 |
| 4,786,481 | A | * | 11/1988 | Kataoka et al. .................... 423/7 |
| 2007/0031329 | A1 | * | 2/2007 | Velikyan et al. ............. 424/1.49 |
| 2007/0207075 | A1 | * | 9/2007 | Fassbender ....................... 423/2 |
| 2009/0001283 | A1 | | 1/2009 | Fitzsimmons et al. |

OTHER PUBLICATIONS

Nakayama et al. A new 68Ge/68Ga generator system using an organic polymer containing N-methylglucamine groups as adsorbent for 68Ge. Applied Radiation and Isotopes, 58 (2003) 9-14.*
Tundo et al. Anion-exchange properties of ammonium salts immobilized on silica gel. J. Am. Chem. Soc. 104 (1982) 6547-6551.*

* cited by examiner

*Primary Examiner* — Katherine Zalasky
(74) *Attorney, Agent, or Firm* — Muncy, Geissler, Olds & Lowe, P.C.

(57) ABSTRACT

A Gallium-68 (Ga-68) radioisotope generator includes a generating column and a citrate eluent. The generating column is at least partially filled with an ion-exchange resin with glucamine groups to absorb germanium-68 (Ge-68) and Ga-68 radioisotopes. The citrate eluent is added into the generating column to desorb the Ga-68 radioisotope and form an eluent containing the Ga-68 radioisotope in the form of Ga-68 citrate. A method for generating Ga-68 radioisotope is also disclosed.

6 Claims, 6 Drawing Sheets

GALLIUM-68 RADIOISOTOPE GENERATOR AND GENERATING METHOD THEREOF

CROSS REFERENCE TO RELATED APPLICATIONS

This Non-provisional application claims priority under 35 U.S.C. §119(a) on Patent Application No(s). 099123148 filed in Taiwan, Republic of China on Jul. 14, 2010, the entire contents of which are hereby incorporated by reference.

BACKGROUND OF THE INVENTION

1. Field of Invention

The present invention relates to a Ga-68 radioisotope generator and a method applied in the same.

2. Related Art

Ga-68 is a type of radioisotope which is characterized by short half-life and positron decay. Major application of Ga-68 is to be processed for agents of positron emission used in the fields of nuclear medicine and clinical diagnosis. Ga-68 is easy to use, effective treatment and low-cost for users, especially in hospitals or research institutes without cyclotrons.

Ga-68 is a daughter nuclide created from the decay of Ge-68, which is the product generated from Ga-69 after irradiation of the cyclotron. The half-life of Ge-68 is considerably long, generally up to 271 days, and its maximum energy is 511 KeV. However, once Ge-68 turns into Ga-68 with 69Ga(p,2n)68Ge nuclear equation, its half-life becomes 68.1 minutes and its maximum energy is down to an applicable range in $\beta+=1.89$ MeV.

Since the half-life of the parent nuclide is long enough, the nuclide generator of Ge-68/Ga-68 can remain functional and stably provide Ga-68 more than one year. It is considerably valuable in the field of nuclear medicine. In conventional art, inorganic materials such as silicon dioxide, aluminum oxide and zinc dioxide are used to absorb Ge-68 in the Ge-68/Ga-68 nuclide generator. Then, Ga-68 is created through the absorbed Ge-68 after the processes of decay and elutriation.

However, there are a few defects in the conventional Ge-68/Ga-68 nuclide generator. For example, if Ge-68 is absorbed by aluminum oxide filled in an absorption tube of the nuclide generator, the daughter nuclide Ga-68 has to be eluted with ethylenediaminetetraacetic acid (EDTA). Consequentially, the product, Ga-68-EDTA, is a type of considerably stable complex, which must to be proceeded with other complicated treatments to transform Ga-68 into radiopharmaceuticals. Unfortunately, because the half-life of Ga-68 is short, a huge amount of Ga-68 is lost in the transformation process. As regards zinc dioxide, when it is filled in the absorption tube, the eluent for the nuclide Ga-68 has to be 1N hydrochloric acid and the product has to be processed with neutralization reaction before further application. It is hard to prevent environment contamination and damage resulting from a leakage of inorganic metal ions dissolved in the hydrochloric acid.

Therefore, a Ga-68 radioisotope generator with high production rate and low pollution has been desired. In addition, the Ga-68 radioisotope generator is preferably simple-configured and easy to use for hospitals and research institutes to reduce loadings and costs.

SUMMARY OF THE INVENTION

In view of the foregoing, an objective of the present invention is to provide a Ga-68 radioisotope generator with high production rate and low pollution.

To achieve the above objective, a Ga-68 radioisotope generator in accordance with the present invention includes a generating column and a citrate eluent. The generating column is at least partially filled with an ion-exchange resin with glucamine groups to absorb Ge-68 radioisotope and Ga-68 radioisotope. The citrate eluent is added into the generating column to desorb the Ga-68 radioisotope and form an eluent containing the Ga-68 radioisotope in the form of Ga-68 citrate.

To be noticed, the term "at least partially filled with" as used herein refers to that a filler is disposed in a container or a column to at least fill a part of entire containing space of the container or the column substantially such that a liquid or a semi-solid certainly contacts the filler when flowing through the container or the column.

In addition, in the aforementioned embodiment, the ion-exchange resin with glucamine groups is preferably a porous poly(styrene-divinylbenzene) resin, and the citrate eluent is preferably a sodium citrate eluent.

In one embodiment of the present invention, the gallium-68 radioisotope generator further includes a transforming column and a hydrochloric acid eluent. The transforming column is connected to an outlet of the generating column and at least partially filled with a silicone gel to absorb the Ga-68 radioisotope. The hydrochloric acid eluent is added into the transforming column to desorb the Ga-68 radioisotope and form an eluate containing the Ga-68 radioisotope in the form of gallium-68 hydrochloride.

In one embodiment of the present invention, the Ga-68 radioisotope generator further includes an alkaline eluate containing the Ge-68 radioisotope. The ion-exchange resin with glucamine groups absorbs the Ga-68 radioisotope when the alkaline eluate is added into the generating column.

In one embodiment of the present invention, the Ga-68 radioisotope generator further includes a chelating column and an alkaline solution. The chelating column is connected to an inlet of the generating column and at least partially filled with an amidoxime chelating resin to absorb Ge-68 radioisotope. The alkaline solution is added into the chelating column to desorb the Ge-68 radioisotope.

To achieve the above, a method for generating Ga-68 radioisotope includes the steps of providing a generating column at least partially filled with an ion-exchange resin with glucamine groups, adding an alkaline eluate containing the Ge-68 radioisotope into the generating column to absorb the Ge-68 radioisotope by the ion-exchange resin with glucamine groups and adding a citrate eluent into the generating column to absorb the Ge-68. The Ga-68 radioisotope is created from the decay of the Ge-68 radioisotope.

Preferably, the ion-exchange resin with glucamine groups is a porous poly(styrene-divinylbenzene) resin and the citrate eluent is a sodium citrate eluent.

In one embodiment of the present invention, the method for generating the Ga-68 radioisotope further includes the steps of providing a transforming column connected to an outlet of the generating column and at least partially filled with a silicone gel to absorb the Ga-68 radioisotope and adding a hydrochloric acid eluent into the transforming column to desorb the Ga-68 radioisotope and form an eluate containing the Ga-68 radioisotope in the form of Ga-68 hydrochloride.

In one embodiment of the present invention, the method for generating the Ga-68 radioisotope further includes the steps of providing a chelating column connected to an inlet of the generating column and at least partially filled with an amidoxime chelating resin, adding an acidic eluate containing the germanium-68 radioisotope into the chelating column to absorb the Ge-68 radioisotope and adding an alkaline solution to desorb the Ge-68 radioisotope.

In one embodiment of the present invention, the method for generating the Ga-68 radioisotope further includes the step of adding a nitrite acid solution to a Ge-68 target material irradiated by protons to form the acidic eluate containing the Ge-68 radioisotope.

In summary, a Ga-68 radioisotope generator and a method applied in the same in accordance with the present invention are characterized by the use of an organic resin (i.e. ion-exchange resin with glucamine groups) and its selective absorption for Ga-68 in comparison with Ge-68 to generate Ga-68 nuclide. In combination with a citrate eluent, it can prevent the formation of metal ion liquid waste in the reaction so as to reduce potential environmental pollution threats effectively.

Comparing to the conventional art, inorganic absorption materials such as aluminum oxides or zinc oxides are replaced by the organic ion-exchange resin in the Ga-68 radioisotope generator and a method applied in the same in accordance with the present invention to generate the Ga-68 radioisotope in the form of Ga-68 citrate. It complies with the values and rules of environment protection and, more importantly, generates high purity of Ga-68 from Ge-68 for direct utilization after mixing with a tag solution.

In addition, the Ga-68 radioisotope in the form of Ga-68 citrate can be transformed into that in the form of Ga-68 hydrochloride, which is more generally used, by combining the generator with a transforming column. It prevents further complication to users from the non-regular product.

The apparatus in accordance with the present invention is simple designed, easily operated and suitable for various hospitals and research institutes to provide the publics better clinic diagnosis in the field of nuclear medicine and increase social welfare.

DETAILED DESCRIPTION OF THE INVENTION

The present invention will be apparent from the following detailed description, which proceeds with reference to the accompanying drawings, wherein the same references relate to the same elements.

Figure 1:
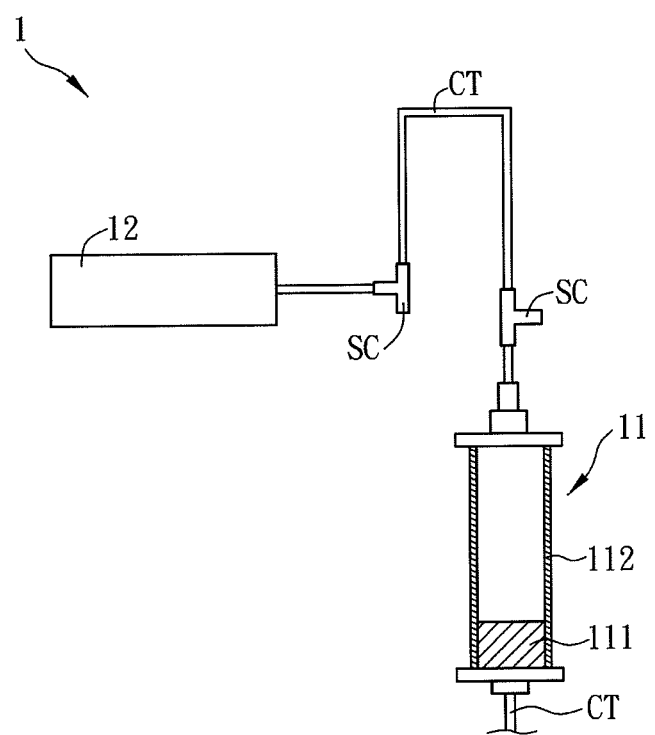
FIG. 1 is a schematic diagram of a Ga-68 radioisotope generator in accordance with a preferable embodiment of the present invention.

As shown in FIG. 1, a Ga-68 radioisotope generator in accordance with the present invention includes a generating column 11 and a citrate eluent. The generating column 11 is at least partially filled with an ion-exchange resin 111 with glucamine groups to absorb Ge-68 radioisotope and Ga-68 radioisotope. The citrate eluent is added into the generating column to desorb the Ge-68 radioisotope and form an eluate containing the Ga-68 radioisotope in the form of Ga-68 citrate.

The column body 112 of the generating column 11 can be a regular column used for ion-exchange reactions, a customized column for specific needs or a hand-made column. The size of the generating column 11 is not limited and can be adjusted as necessary. In the present embodiment, the inner diameter of the column body 112 of the generating column 11 is 0.5 cm. The material of the generating column 11 is preferably glass and, more preferably, the generating column 11 is for example a glass column fabricated by BIO-RAD.

The generating column 11 is at least partially filled with the ion-exchange resin 111 with glucamine groups, which has a resin as the insoluble matrix and glucamine groups as the ion-functional groups. Preferably, the ion-exchange resin 111 has a cross-linked polystyrene resin as the matrix and N-methylglucamine groups as the ion-functional groups to absorb the Ge-68 radioisotope contained in the added or injected solutions, liquids or semi-solids (called solutions or raw material liquids in the following).

Therefore, when the solution containing the Ge-68 radioisotope (i.e. the raw material liquid) is added into the generating column 11, the ion-exchange resin 111 with glucamine groups absorbs the Ge-68 radioisotope. The aforementioned raw material liquid can be any solution containing the Ge-68 radioisotope. The aforementioned raw material liquid can be obtained or generated in various processes as well. The type of the solvent and the pH value of the raw material liquid are not limited. Herein, an alkaline solution at pH 8 is taken as an example of the raw material liquid.

As shown in FIG. 1, in the present embodiment, the generating column 11 is a column filled with a porous poly (styrene-divinylbenzene) resin (e.g. merchant DIAION® CRB-02) 0.3 to 0.5 g, preferably 0.4 g. In more detailed, the column has an inner diameter of 0.5 cm and can be respectively connected to two three way stopcocks SC at the top and the bottom ends by connection pipes CT.

The three way stopcocks SC can control the timing and the flow rate of the added solution. In order to improve the reaction effectiveness of the generating column 11, the generating column 11 can be conditionalized for the absorption of the Ge-68 radioisotope. In practice, the generating column 11 can be conditionalized for adjusting the chemical condition of the resin to comply the next absorption condition by NaOH solution (20 ml, pH 8) at a flow rate of 0.5 ml/min.

Similarly, in order to adjust the reaction condition, the alkaline eluate containing the high concentration of the Ge-68 radioisotope can be added with 1M NaOH solution to adjust the eluate to pH 8 as well. The Ga-68 radioisotope is gradually created from the decay of the Ge-68 absorbed by the generating column 11 until the reaction is balanced after 12 hrs. To be noticed, the created Ga-68 radioisotope also remains absorbed until desorbed by the citrate eluent in the following process.

It is worth mentioning that the generating column 41 can be treated with two eluting processes before added with the citrate eluent in order to improve the chromatographic ability. One of the eluting processes is conducted by adding the second eluent 30 ml, for example pH 8 NaOH solution 30 ml, from the second eluent supporting unit 46. The other is conducted by adding the third eluent 60 ml, for example pH 9 0.2M NaOH solution 30 ml, from the third eluent supporting unit 47. The flow rate of the solutions in both of the eluting processes is 0.5 ml/min. Through the eluting processes, the undesired elements, which were not absorbed, are removed and thereby only Ge-68 and Ga-68 are left in the chelating column 43.

Generally, the citrate eluent is a type of solution containing citrate. In the present embodiment, the preferable citrate eluent is a sodium citrate eluent stored in a citrate eluent supporting unit 12. The citrate eluent supporting unit 12 can be any commercially suitable container or device able to provide power or receive an outer force for adding the citrate eluent into the generating column 11. In the present embodiment, the pH value of the citrate eluent is 9, and the citrate eluent supporting unit 12 is a syringe.

Figure 2A:
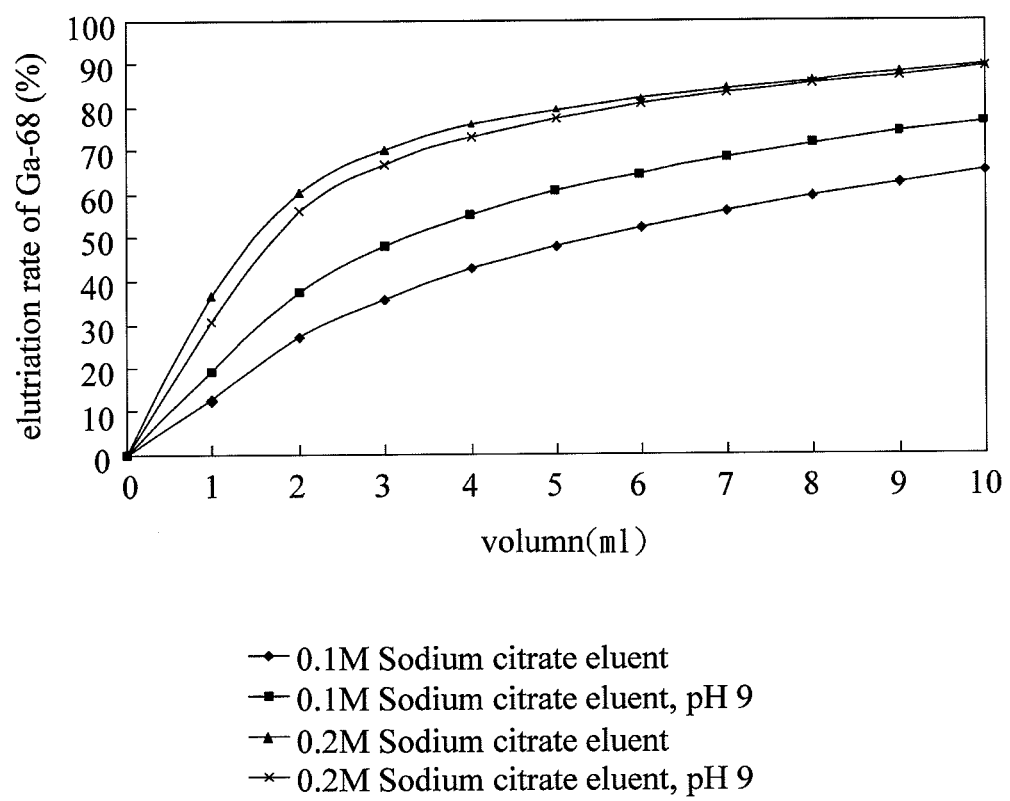
FIG. 2A is a comparison diagram of the elutriation rate of the Ga-68 radioisotope resulting from the elutriation of the generating column by the citrate eluent with different concentrations or at different pH levels.

The citrate eluent is added into the generating column 11 at a flow rate of 0.5 ml/min by an external pump of the citrate eluent supporting unit 12. FIG. 2A is a comparison diagram of the elutriation rate of the Ga-68 radioisotope resulting from the elutriation of the generating column by the citrate eluent with different concentrations or at different pH levels. As shown in FIG. 2A, when the amount of the added citrate eluent is sufficient, such as 10 ml, the 0.1 or 0.2M citrate eluent (illustrated as the curves labeled with rhombuses and triangles respectively) or the 0.1 or 0.2M citrate eluent at specific pH value (pH 9, illustrated as the curves labeled with squares and crosses respectively) can perform a high level of the Ga-68 elutriation rate (at least close to 50%). It proves that the citrate eluent indeed desorbs the Ga-68 radioisotope from the resin 111 filled in the generating column 11.

More importantly, in the elutriation process, the elutriation rate of the Ge-68 radioisotope, which indicates that the ratio of the Ge-68 radioisotope desorbed with the Ga-68 radioisotope to the Ge-68 radioisotope reminded, is considerably low. It proves that the purity of the Ga-68 radioisotope contained in the solution is considerably high. Taking the 0.2M citrate eluent 10 ml as an example, its elutriation rate is $4.5 \times 10^{-3}$%. Oppositely, the elutriation rate of the Ga-68 radioisotope is up to 75.5%.

Figure 2B:
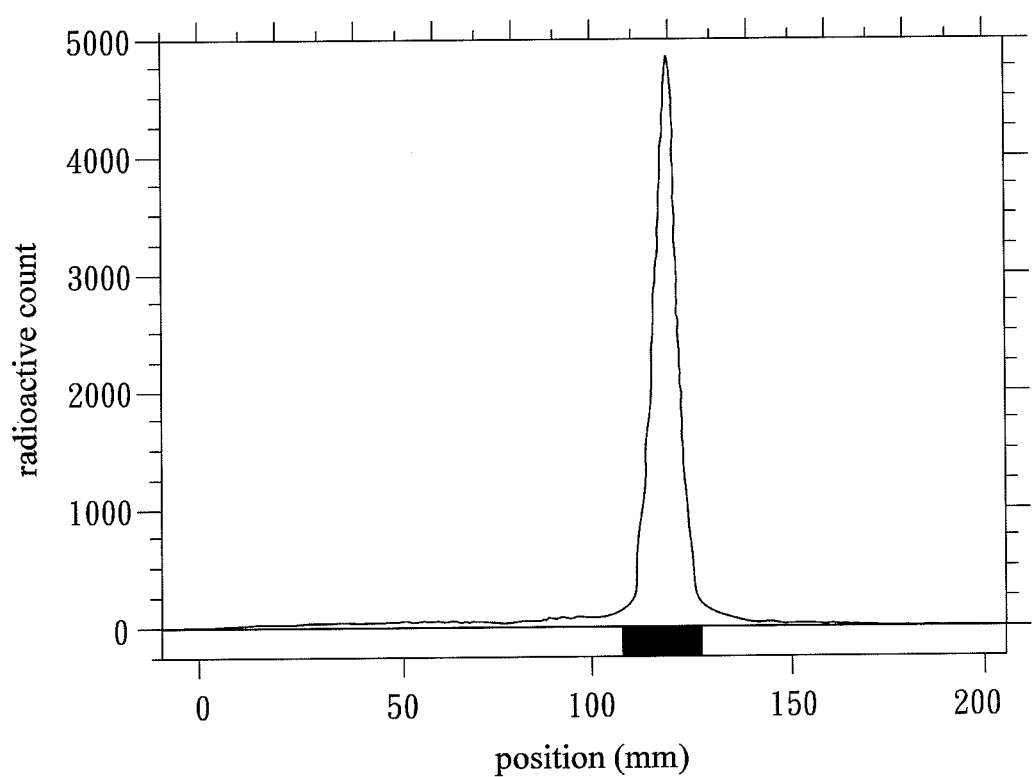
FIG. 2B is an analysis diagram of radiochemical purity of the Ge-68 radioisotope contained in the eluate.

After the citrate eluent is added into the generating column 11, it transforms into the eluent containing the high purity Ga-68 radioisotope in the form of Ga-68 citrate. FIG. 2B is an analysis diagram of radiochemical purity detection used to detect the purity of the Ge-68 radioisotope in the eluate containing the Ga-68 radioisotope in the form of Ga-68 citrate. The eluate containing the Ga-68 radioisotope in the form of Ga-68 citrate was taken as a sample in the present analysis.

First, the sample was disposed on an aluminum plate in size 20×20 and then the aluminum plate was disposed on a Thin Layer Chromatography (TLC) plate. The analysis was conducted by BIOSCAN AR-2000 Imaging Scanner and WinScan 3. As shown in FIG. 2B, the peaks in the diagram indicate the radioactive attributes of the Ga-68 radioisotope in the eluate (Y-axis is the radioactive attributes and X-axis is the positions of the Ga-68 radioisotope in millimeter units in TCL process).

Afterward, the analysis diagram illustrates that all radioactivity is detected in the region of interest (ROI) (shown as the peaks of the diagram), which is the distribution region of the Ga-68 radioisotope. Accordingly, the result indicates the purity of the Ga-68 radioisotope is 100% in the eluate containing the Ga-68 radioisotope in the form of Ga-68 citrate.

In addition, the Ga-68 radioisotope in the form of Ga-68 citrate is a type of organic compound causing low potential treats to the environment. It is also a convenient product, which is "ready-to-use" for related techniques in the field of nuclear medicine and can be directly used in positron emission tomography by simply mixing with a tag solution or pharmaceutical composition instead of additional complicated processes.

Figure 3:
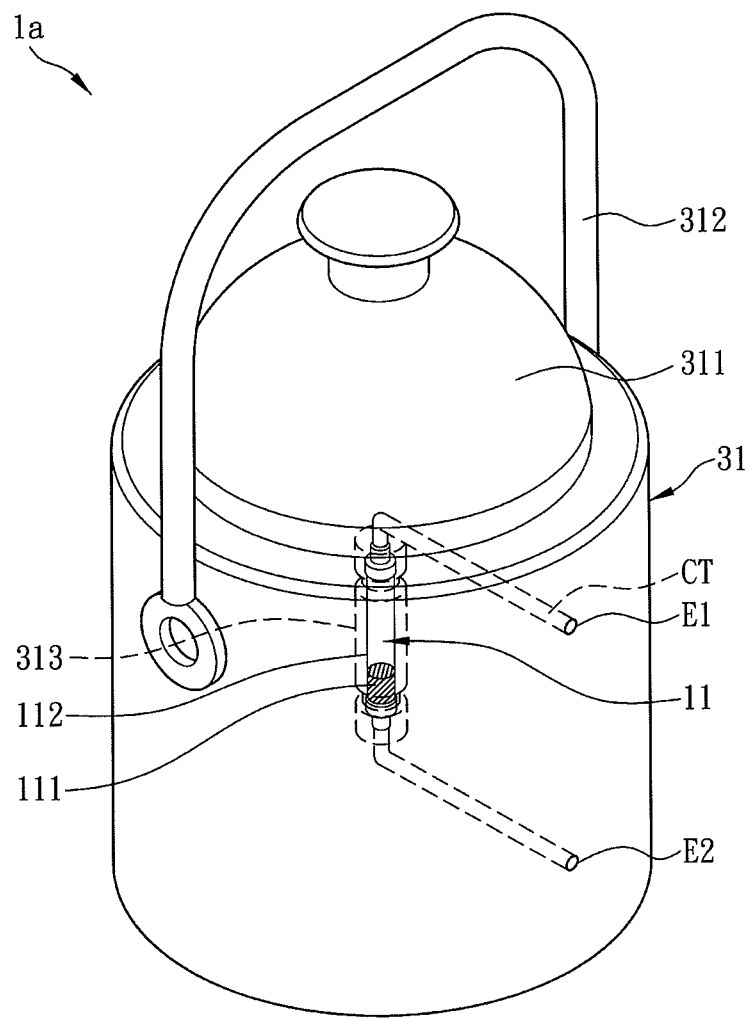
FIG. 3 is a schematic diagram of the Ga-68 radioisotope generator in accordance with another aspect of the embodiment shown in FIG. 1.

Except for the aforementioned aspects, the Ga-68 radioisotope generator in accordance with another aspect of the present embodiment can further includes a housing, in which the generating column is disposed. The housing is suitable for storage and delivery. As shown in FIG. 3, in another embodiment of the present invention, the Ga-68 radioisotope generator can further includes a rigid housing. Preferably, the Ga-68 radioisotope generator further includes a top covering part 311 and a hand-holding part 312 for easy operation. The generating column 11 disposed in the housing 31 can be accessible by the top covering part 311. The hand-holding part 312 is for users to hold for the purposes of carriage or delivery.

The generating column 11 is connected by a connection tube CT and thereby form an opening E1 on the lateral wall of the housing 31. The citrate eluent can be added into the generating column 11 via the connection tube CT and the opening E2. Then, the citrate eluent forms the citrate eluate containing the Ga-68 radioisotope and flows out from the opening E2 via another connection tube CT. The configuration of the housing 31 can provide extra safety protection for operators or medical staff while operating the Ga-68 radioisotope generator by the radiation-proof material of the housing 31 such as metal or alloy. Additionally, the generating column 11 can be further disposed in a fixing element 313 inside the housing ahead to improve the protection and stability of the generating column 11 and the radioisotope thereof.

In accordance with the aforementioned, the high purity Ga-68 radioisotope in the form of Ga-68 citrate can be easily generated by the simple configuration of the Ga-68 radioisotope generator of the present invention. In addition, the product of the present invention is a type of organic compound, which has low potential pollution threats to the environment. It is also ready for practical application in the related technique of nuclear medicine so as to simplify the preparation process of medical diagnosis. Moreover, the Ga-68 radioisotope generator can be further configured with additional elements to independently transform stable Ga-69 into Ga-68 solution applied in nuclear medicine. In this regard, it is considerably practical.

Another embodiment of the present invention is taken as an example in the following to further describe other details of the apparatus of the present invention.

Figure 4:
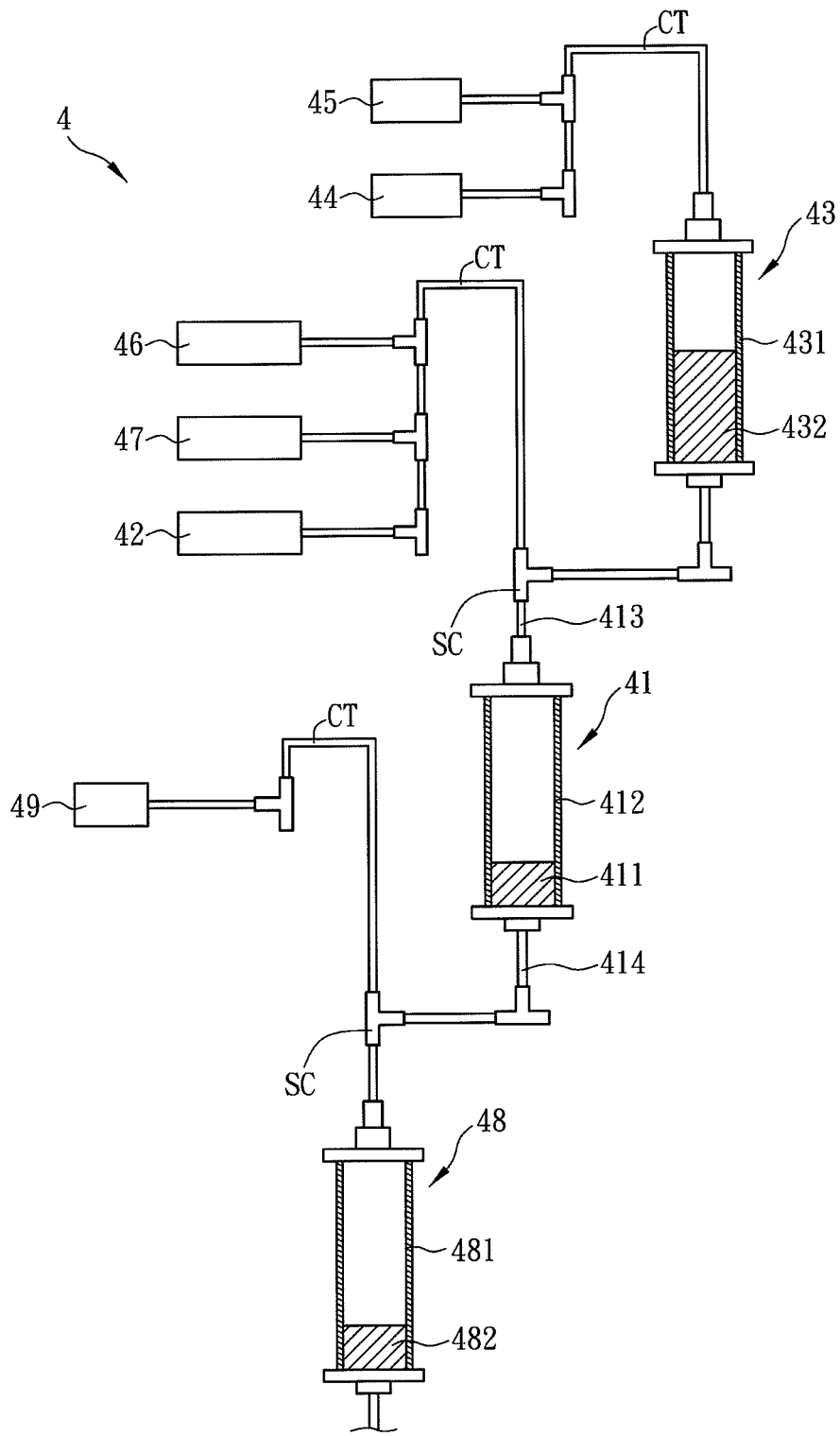
FIG. 4 is a schematic diagram of a Ga-68 radioisotope generator in accordance with another preferable embodiment of the present invention.

As shown in FIG. 4, in the present embodiment, the Ga-68 radioisotope generator 4 can further include a chelating column 43 besides the aforementioned elements consisting of the generating column 41, the ion-exchange resin 411 with glucamine groups, the column body 412 and the citrate eluent supporting unit 42. The chelating column 43 is connected to an inlet 413 of the generating column 41 by a three way stopcock SC and a connection tube CT. As regards the material of the column body 431 of the chelating column 43, it is similar to that of the column body 411 of the generating column 41 and the detailed description thereof will be omitted. The inner diameter of the column body 431 can be 0.7 to 1 cm and, preferably, is 0.7 cm.

The chelating column 43 is at least partially filled with an amidoxime chelating resin 432 to absorb the Ge-68 radioisotope. In more detailed, the amidoxime chelating resin 432 can be commercial Purolite S910 designed for removal of cations of metals except alkaline earth metal ions. The appearance of Purolite S910 is light yellow or gray opaque spherical particles (the particle size is not limited). The source of the Ge-68 radioisotope absorbed by the chelating column 43 can be for example but not limited to a solid target irradiated by proton beam.

In more detailed, the Ga-69 0.8 g with a purity of 99% can be electroplated on a standard solid target and then be irradiated by the proton beam with an energy of 20 MeV continuously until 1,2000 μAh. After the irradiation process, the surface of the solid target is washed by 10N HNO3 to form an acidic eluate containing the Ge-68 radioisotope in order to provide the Ge-68 radioisotope for the chelating column 43. Preferably, the acidic eluate can be further simply purified and then re-collected by glass filters ahead.

To be noticed, the amidoxime chelating resin 432 can be conditionalized ahead to reach a chemical condition suitable to absorb the Ge-68 in order to increase of the Ge-68 absorption ability. Therefore, in the present embodiment, the chelating column 43 can be conditionalized by 20 ml of the first rinsing solution (10M $HNO_3$) provided by a first rinsing solution supporting unit 44 with a flow rate of 0.4 ml/min. The first rinsing solution supporting unit 44 can be like the syringe described in the aforementioned and the detailed description thereof will be omitted.

Afterward, the acidic eluate containing the Ge-68 radioisotope can be added into the chelating column 43 with a flow rate of 0.2 ml/min. The Ge-68 radioisotope is absorbed by the amidoxime chelating resin 432. The waste liquid flowing out can be recycled as the Ga-69 solid target. Then, the chelating column 43 is washed three times by 10M $HNO_3$ with the same flow rate for completely removing the unabsorbed elements from the chelating column 43 and recycling the waste liquid including the Ga-69 radioisotope.

As shown in FIG. 4, the alkaline solution is provided and added into the chelating column 43 to desorb the Ge-68 radioisotope by an alkaline solution supporting unit 45. In the present embodiment, the alkaline solution supporting unit 45 can be like the syringe described in the aforementioned and the detailed description thereof will be omitted. In addition, the alkaline solution can be for example 60 ml of 0.01M NaOH solution. The alkaline solution is added into the chelating column 43 with a flow rate of 0.2 ml/min to simultaneously desorb the Ge-68 radioisotope and form the alkaline eluate containing the high purity Ge-68 radioisotope by a selective ion-exchange reaction so as to purify the Ge-68 radioisotope from the other metal ions (for example silver and zinc).

The characteristics of the generating column 41, the citrate eluent 42 and the conditionalization and elutriation processes applied therefor have been described and thereby the detailed description will be omitted. After the alkaline eluate containing the high purity Ge-68 radioisotope is added into the generating column 41, the Ge-68 radioisotope is absorbed by the ion-exchange resin 411 with glucamine groups. Then, the Ge-68 and the Ga-68 created from the decay of the Ge-68 reaches their reactive balance after a while, preferably 12 hrs. At this moment, both of the Ge-68 radioisotope and the Ga-68 radioisotope are absorbed by the ion-exchange resin 411 with glucamine groups.

Afterward, by eluting the generating column 41 with the citrate eluent, the eluate containing the Ga-68 radioisotope in the form of Ga-68 citrate can be formed.

As shown in FIG. 4, in the present embodiment, the Ga-68 radioisotope generator 4 can further includes a transforming column 48. The eluate containing the Ga-68 radioisotope in the form of Ga-68 citrate can be conducted to the transforming column 48 for transforming the salt form in reaction with the Ga-68 radioisotope. The transforming column 48 can be connected to an outlet 414 of the generating column 41 by a three way stopcock SC and a connection tube TC.

As regards the material of the column body 481 of the transforming column 48, it is similar to that of the column body 412 of the generating column 41 and thereby the detailed description thereof will be omitted. In the present embodiment, the inner diameter and the length of the column body 431 can be for example 0.9 cm and 2 cm, respectively. The transforming column 48 is at least partially filled with silicone gel 482. The suitable silicone gel 482 is not limited but preferably commercial Water Spe-Pak® Vac Silica (product code 052337171A) 3 ml. To be noticed, both of the chelating column 43 and the transforming column 48 can be disposed in the aforementioned housing 31 to protect operators from radioactive damage.

When the eluate containing the Ga-68 radioisotope in the form of Ga-68 citrate is added into the transforming column 48, the Ga-68 radioisotope is absorbed by the silicone gel 482. Afterward, a hydrochloric acid eluent provided by a hydrochloric acid eluent supporting unit 49 is added into the transforming column 48 to desorb the Ga-68 radioisotope and thereby form an eluate containing the Ga-68 radioisotope in the form of Ga-68 hydrochloride. In the present embodiment, the hydrochloric acid eluent supporting unit 49 can be like the syringe described in the aforementioned and thereby the detailed description thereof will be omitted. The hydrochloric acid eluent can be for example 3 ml of 0.1M hydrochloric acid and added into the transforming column 48 with a flow rate of 1.1 ml/min. Accordingly, the Ga-68 radioisotope in the form of Ga-68 citrate can be transformed into that in the form of Ga-68 hydrochloride as another product solution for the field of nuclear medicine by the function of the silicone gel 482 of the transforming column 48 and the hydrochloric acid eluent.

Figure 5:
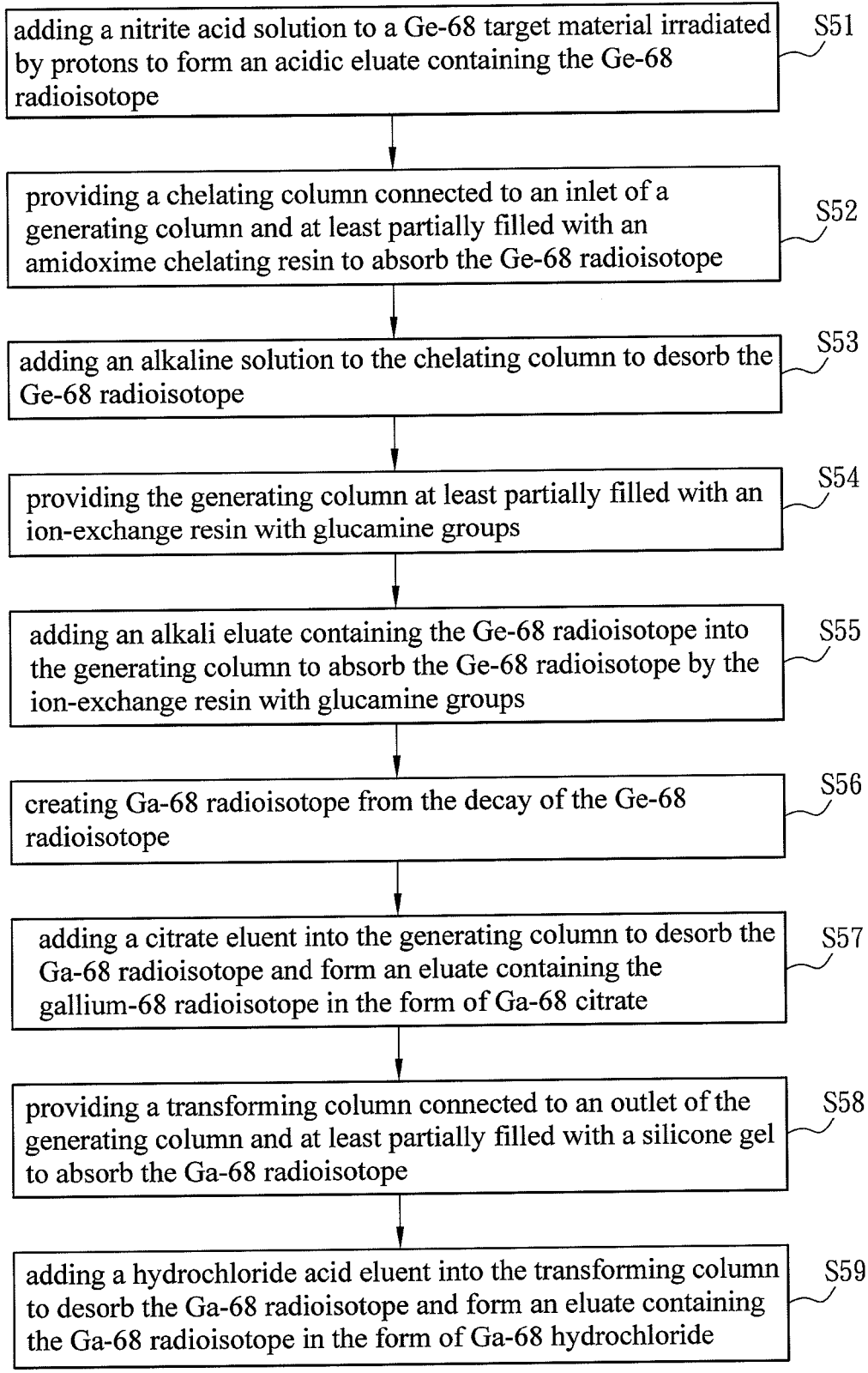
FIG. 5 is a flow chart of a method for generating the Ga-68 radioisotope in accordance with a preferable embodiment of the present invention.

Besides the Ga-68 radioisotope generator described in the aforementioned embodiment, a method for generating Ga-68 radioisotope in accordance with the present invention is disclosed as well. As shown in FIG. 5, in the present embodiment, the method for generating Ga-68 radioisotope includes the steps of adding a nitrite acid solution to a Ge-68 target material irradiated by protons to form an acidic eluate containing the Ge-68 radioisotope (S51), providing a chelating column connected to an inlet of a generating column and at least partially filled with an amidoxime chelating resin to absorb the Ge-68 radioisotope (S52), adding an alkaline solution to the chelating column to desorb the Ge-68 radioisotope (S53), Providing the generating column at least partially filled with an ion-exchange resin with glucamine groups (S54), adding an alkaline eluate containing the Ge-68 radioisotope into the generating column to absorb the Ge-68 radioisotope by the ion-exchange resin with glucamine groups (S55), creating Ga-68 radioisotope from the decay of the Ge-68 radioisotope (S56), adding a citrate eluent into the generating column to desorb the Ga-68 radioisotope and form an eluate containing the gallium-68 radioisotope in the form of Ga-68 citrate (S57), providing a transforming column connected to an outlet of the generating column and at least partially filled with a silicone gel to absorb the Ga-68 radioisotope (S58) and adding a hydrochloric acid eluent into the transforming column to desorb the Ga-68 radioisotope and form an eluate containing the Ga-68 radioisotope in the form of Ga-68 hydrochloride (S59).

The method for generating Ga-68 radioisotope and the steps thereof can be applied in the aforementioned Ga-68 radioisotope generator. The detailed description will be omitted. However, to be noticed, the configuration and the elements in the aforementioned embodiment are taken as the example for detailed description and cannot be used to limit the scope of the method in accordance with the present invention.

In summary, a Ga-68 radioisotope generator and a method applied in the same in accordance with the present invention are characterized by the use of an organic resin (i.e. ion-exchange resin with glucamine groups) and its selective absorption for Ga-68 in comparison with Ge-68 to generate Ga-68 nuclide. In combination with a citrate eluent, it can prevent the formation of metal ion liquid waste in the reaction so as to reduce potential environmental pollution threats effectively.

Comparing to the conventional art, inorganic absorption materials such as aluminum oxides or zinc oxides are replaced by the organic ion-exchange resin in the Ga-68 radioisotope generator and a method applied in the same in accordance with the present invention to generate the Ga-68 radioisotope in the form of Ga-68 citrate. It complies with the values and rules of environment protection and, more importantly, generates high purity of Ga-68 from Ge-68 for direct utilization after mixing with a tag solution.

In addition, the Ga-68 radioisotope in the form of Ga-68 citrate can be transformed into that in the form of Ga-68 hydrochloride, which is more generally used, by combining the generator with a transforming column. It prevents further complication to users from the non-regular product. The apparatus in accordance with the present invention is simple designed, easily operated and suitable for various hospitals and research institutes to provide the publics better clinic diagnosis in the field of nuclear medicine and increase social welfare.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for generating gallium-68 radioisotope comprising the steps of:
   providing a generating column at least partially filled with an ion-exchange resin with glucamine groups;
   adding an alkaline eluate containing the germanium-68 radioisotope into the generating column to absorb the germanium-68 radioisotope by the ion exchange resin with glucamine groups;
   creating gallium-68 radioisotope front the decay of the germanium-68 radioisotope in the generating column;
   adding a citrate eluent into the generating column; and
   providing a transforming column connected to an outlet of the generating column and at least partially filled with a silicone gel to absorb the gallium-68 radioisotope.

2. The method of claim 1 further comprising the steps of:
   adding a hydrochloric acid eluent into the transforming column to desorb the gallium-68 radioisotope and form an eluate containing the gallium-68 radioisotope in the form of gallium-68 hydrochloride.

3. The method of claim 1 further comprising the steps of:
   providing a chelating column connected to an inlet of the generating column and at least partially filled with an amidoxime chelating resin;
   adding an acidic eluate containing the germanium-68 radioisotope into the chelating column to absorb the germanium-68 radioisotope; and
   adding an alkaline solution to desorb the germanium-68 radioisotope.

4. The method of claim 3 further comprising the step of:
   adding a nitrite acid solution to a germanium-68 target material irradiated by protons to form the acidic eluate containing the germanium-68 radioisotope.

5. The method of claim 1, wherein the ion-exchange resin with glucamine groups is a porous poly(styrene-divinylbenzene) resin.

6. The method of claim 1, wherein the citrate eluent is a sodium citrate eluent.

* * * * *